United States Patent [19]
Boutin

[11] 4,004,831
[45] Jan. 25, 1977

[54] CONDUIT CONNECTORS

[76] Inventor: Gilbert R. Boutin, 14 E. Hill Road, Woodbury, Conn. 06798

[22] Filed: Mar. 1, 1976

[21] Appl. No.: 662,925

[52] U.S. Cl. ............................................... 285/81
[51] Int. Cl.² ......................................... F16L 35/00
[58] Field of Search ............ 285/81, 340, 359, 395, 285/DIG. 22

[56] References Cited
UNITED STATES PATENTS

| | | | |
|---|---|---|---|
| 1,440,207 | 12/1922 | Burns ................................ | 285/340 |
| 2,158,757 | 5/1939 | Kuestermeier .................... | 285/340 |
| 3,116,945 | 1/1964 | Blomquist et al. ............ | 285/340 X |
| 3,312,483 | 4/1967 | Leadbetter et al. .............. | 285/340 |
| 3,591,205 | 7/1971 | Hamburg ............................. | 285/81 |
| 3,633,944 | 1/1972 | Hamburg ............................. | 285/81 |
| 3,697,102 | 10/1972 | Falke ................................ | 285/340 |
| 3,924,882 | 12/1975 | Ellis ................................ | 285/340 X |

*Primary Examiner*—Alfred R. Guest
*Attorney, Agent, or Firm*—Walter Spruegel

[57] ABSTRACT

In a conduit connector, the tubular body has on one end spaced sections of an outer flange, and the applied cap has a peripheral wall over the one body end and an inner endshoulder opposite the flange sections on the body, while the locking gland is with its flat ring base interposed between the flange sections and the endshoulder on the body and cap, respectively, and is clamped thereto on twisting the cap into a tightened condition on the connector, with the cap being also provided on its peripheral wall with a few spaced and preferably impressed round beads which in a loose condition of the cap align with the spaces between the flange sections on the body, but on a twist of the cap into its tightened condition are moved beneath the flange sections to thereby clamp the same and the ring base of the gland thereon to the endshoulder of the cap with a crushing vice-like grip.

11 Claims, 12 Drawing Figures

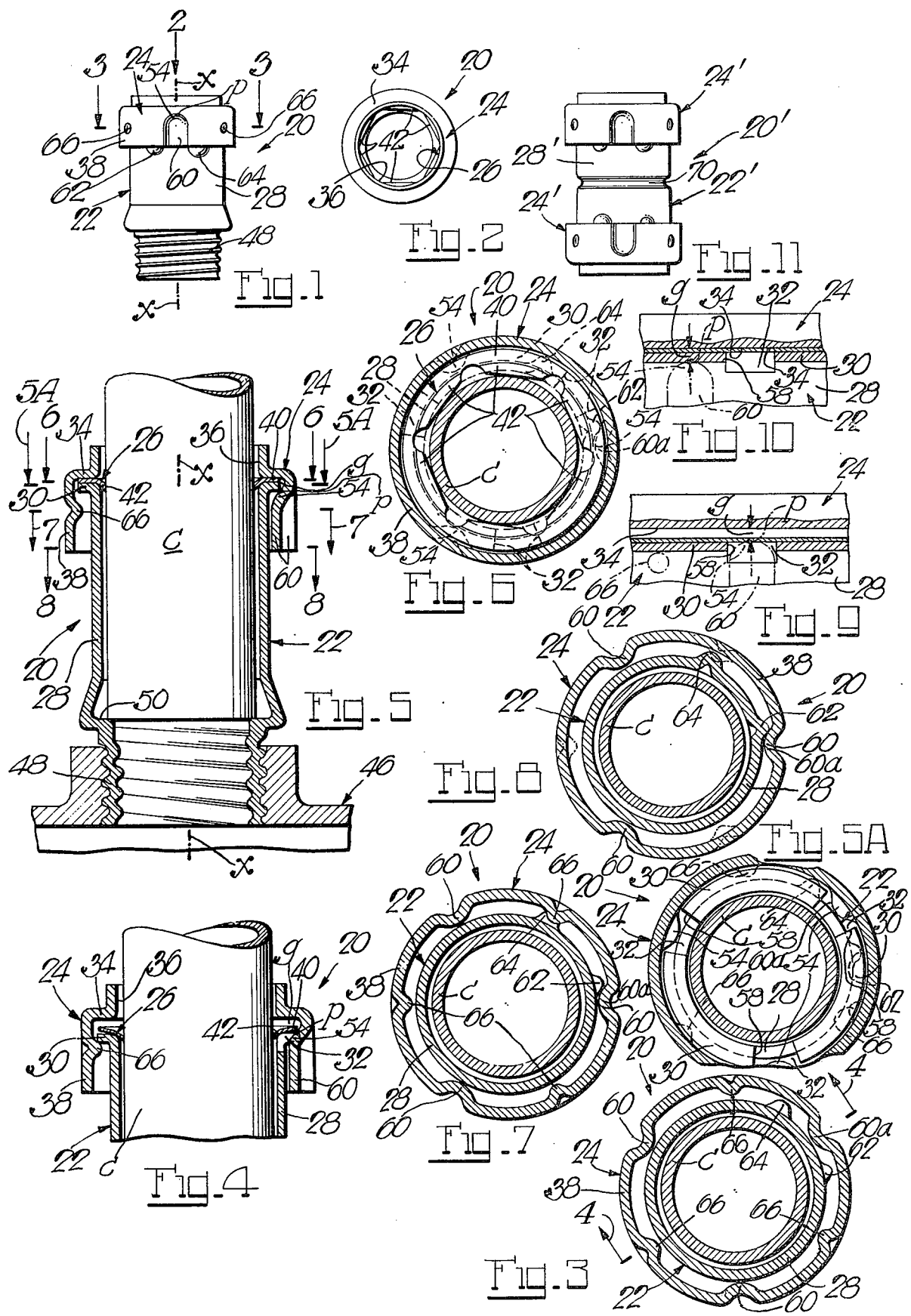

CONDUIT CONNECTORS

This invention relates to conduits for electric wiring in general, and to connectors for such conduits in particular.

The type of connector with which the present invention is concerned has a tubular body with an apertured cap which is screwed on the body, and a locking gland having a flat ring base and short inward prongs on and inclined to the base, with the body and cap having opposite inner shoulders and the gland being interposed with its ring base between these shoulders and thereby held for projection with its prongs into engagement with a conduit to which the connector is applied by simple and easy slip-on. Once a connector is thus applied to a conduit, the cap is tightened on the body to thereby lock the conduit to the connector through intermediation of the locking gland.

While connectors of this type are satisfactory in most respects, they do fall short of meeting the important requirement of affording a conduit lock which is secure without fail in each and every connector application. Thus, by tightening the cap on an applied connector on a conduit, the gland is with its ring base clamped to the shoulders in the connector and is thereby also forced with its short prongs into a very tight jam fit with the conduit, with this jam fit between the conduit and the clamped gland in the connector holding the conduit which fail against accidental retraction from the connector, but the friction lock of the conduit to the connector at the clamped connection between the locking gland and the shoulders in the connector being more often than not too weak to hold the conduit against accidental turning or twisting in the connector, yet such a conduit hold against turning is as indispensible to a lasting and secure conduit connection as is a secure lock of the conduit against retraction from the connector. In this connection, the lock of a conduit against turning is no stronger than the weaker one of the locks of the gland to the conduit and to the connector, respectively, and this weaker lock is the friction lock between the gland and connector, and the deficiency of this friction lock in unfailingly securing a conduit against turning in each and every connector application is due to the fact that the screw-type connection of the cap with the body of the connector, coupled with the usually small clamping areas of the ring base of the gland and of the shoulders in the connector, are hardly conducive to lend to this friction lock adequate tightness for the purpose on tightening the cap with even a maximum force that can reasonably be expected from workmen on the job and which in any event must be below a prohibitive force at which the screw thread on the connector may well be stripped.

It is an important object of the present invention to provide a connector of this type which, in contrast to prior connectors of this type, fully meets the important requirement of affording a conduit lock which is secure without fail in each and every connector application on applying the connector to a conduit with no more than a reasonable force and in a manner which is unmistakable and admits of no error.

It is another object of the present invention to provide a connector of this type which affords the aforementioned secure conduit lock in each and every connector application, by arranging for the locking gland of the assembled connector, besides the secure and characteristic jam fit of its prongs with a conduit, a lock of its ring base to the connector with a crushing vice-like grip which is incomparably tighter than the aforementioned inferior friction grip between the same parts in prior connectors of this type, and is entirely adequate to withstand most any twisting force on the conduit. To this end, the lock of the gland to the connector is by way of compression between engaged parts of the connector body, cap and locking gland, of which the compression is applied to these engaged parts not only at preferably several spaced locations thereof, but their compressed areas at each of these locations are advantageously held to spot dimensions, and the compression between them is achieved by wedging the parts at their engaged spot locations to each other with a reasonable force but at a wedge angle which is infinitely small. With this arrangement, the applied compressive force, by being divided and concentrated on a few area spots on the engaged parts, tortures the affected metal of these parts far more than if this compressive force were undivided and applied evenly to the total continuous contact area of these parts, and this compressive force, produced by forced wedge action at an infinitely small wedge angle on the spot locations on the engaged parts, is of particularly high magnitude which tortures the affected metal of the parts into distortion that has a positive and strong interlock effect on the parts.

It is a further object of the present invention to provide a connector of this type of which the ring base of the locking gland is in the assembled connector interposed between a few, preferably three or more, spaced sections of an outward flange on one end of the connector body and an inner endshoulder on the applied connector cap, and the ring base is clamped to these flange sections on the body and to the shoulder in the cap by spaced inner cam stubs on the peripheral wall of the cap on tightening the latter on the body, with these cam stubs being in loose condition of the cap aligned with the spaces between, and hence held out of reaction of, the flange sections on the body, but being on a twist of the cap into a tightened condition, shifted beneath and into camming engagement with the flange sections to clamp the latter and the gland base thereon to the shoulder in the cap and thereby also tighten the cap on the connector, and the cam stubs being designed to act like a wedge of an infinitely small wedge angle in locking the flange sections and gland base to the cap with the aforementioned crushing vice-like grip on tightening the cap with no more than a reasonable force.

Another object of the present invention is to provide a connector of this type of which the aforementioned inner cam stubs on the connector cap are in the exceedingly simple form of round bead formations which are obtained by simple die impression in the peripheral cap wall. With this arrangement, there is eliminated the heretofore imperative and costly machined thread on the cap and also on the body of the connector for locking the gland to the connector and also tightening the cap, and these connector parts may, instead, be formed entirely in low-cost die operations. Even more important, making corrective changes in the dies, in the course of making the dies, for best functional results of the parts formed by them, as easily gauged from repeat trial operations of the dies, is particularly advantageous in that the die configurations, including those for impressing the round bead formations in the peripheral cap wall, will be of optimum accuracy for forming these connector parts to meet their various requirements and particularly the most exacting connector requirement of locking the gland to the connector with a crushing vice-like grip by wedge action of an infinitely small wedge angle. Further, with the dies so made to form high-precision connector parts that meet the various, including most exacting, connector requirements, these dies secure the important advantage of producing large quantities of the same high-precision connector parts at the exceedingly low cost which efficient die operations entail.

A further object of the present invention is to provide a connector of this type in which the engaged body, gland and cap parts of the connector are securely locked to each other on twisting the cap into a tightened condition on the connector as aforementioned, and this tightened cap condition is unmistakably indicated by a snap action which the one twisting the cap clearly feels and which occurs only when in the course of the twisting the cap the same reaches its tightened condition. To this end, the cap and body parts of the connector are provided with interference projections in the preferred form of simple bead-like impressions which in their snapped-over condition also lock the cap against accidental twisting into loose condition on the connector.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a side view of a conduit connector embodying the invention;

FIG. 2 is an end view of the connector as seen in the direction of the arrow 2 in FIG. 1;

FIG. 3 is an enlarged section through the connector as taken on the line 3—3 of FIG. 1;

FIG. 4 is a fragmentary section through the connector taken substantially on the line 4—4 of FIG. 3;

FIG. 5 is a section through the connector similar to FIG. 4, but showing the connector in a different operating condition;

FIGS. 5A, 6, 7 and 8 are sections through the connector taken substantially on the lines 5A—5A, 6—6, 7—7 and 8—8, respectively, of FIG. 5;

FIGS. 9 and 10 are diagrammatic views, partly in section, of prominent parts of the connector in different stages of cooperation, and FIG. 11 is a side view of a different type of conduit connector which also embodies the invention.

Referring to the drawings, and more particularly to FIGS. 1 to 6 thereof, the reference numeral 20 designates a conduit connector having a body 22 with an axis $x$, a cap 24 and a locking gland 26. The body 22 is tubular and has a peripheral wall 28 and an outwardly extending endflange 30 with several, in this instance three, angularly spaced notches 32 which interrupt the flange 30 (FIGS. 4 to 6, 9 and 10). The cap 24 is of general cup shape, having a bottom 34 with a central aperture 36, and a peripheral rim 38. The locking gland 26, which is preferably of slightly resilient steel, is in the form of a flat ring base 40 and several spaced prongs 42 which extend inwardly from and at an inclination to the base 40.

In the assembled connector, the locking gland 26 is interposed between the body 22 and cap 24 and normally rests with its ring base 40 on the body flange 30, and the cap 24 is projected with its rim 38 over the body flange 30 and gland 26 thereon, and is with its bottom 34 aligned with the ring base 40 of the gland.

The exemplary connector 20 is adapted for mounting on a box 46 or the like, and the connector body 22 is to this end provided with a threaded shank 48 (FIG. 5). A conduit c is applied to the connector by simple and ready insertion of the conduit through the cap end of the connector, with the applied conduit preferably resting on a stop shoulder 50 in the body 22. The inserted conduit is locked to the connector, and more particularly to the connector body 12 through intermediation of the locking gland 26, with the gland 26 being to this end locked with its prongs 42 to the conduit c and with its ring base 40 to the body 22. The gland 26 is with its prongs 42 locked to the conduit c on locking the ring base 40 of the gland to the connector body 22 by a cam action of the cap 24. To this end, the cap 24 is provided on the inside of its rim 38 with preferably several, in this instance three, angularly spaced cam formations 54 which in a certain angular release position of the cap are in axial alignment with the notches 32 in the body flange 30 (FIGS. 4, 5A and 9), and which on a twist of the cap from its release position pass into axial alignment with the body flange 30 in which the latter and the gland base 40 thereon extend into the gaps g between the cam formations 54 in the cap and the bottom 34 of the latter (FIGS. 5, 9 and 10), with these gaps g being so highly constricted widthwise that the body flange 30 and gland base 40 are within the confines of these gaps clamped to each other and to the cam formations and cap bottom with a vice-like grip of crushing proportions.

The cam formations 54 in the cap 24 are in the preferred form of beads which are conveniently impressed in the rim 38 of the cap, and these beads are for all practical intents and purposes round or dome-shaped, although they are in this instance only partly round because they are continuous and merge with longitudinal rib formations 60 which are also impressed in the rim 38 of the cap and serve for a purpose described hereinafter. These bead-type cam formations 54 are shaped, at and in the immediate vicinity of their highpoints p nearest the cap bottom 34, like wedges of infinitely small wedge angles which are highly advantageous in that they will coact with the trailing ends 58 of the body flange 30 at its interruptions in forcing the body flange and gland base thereon into the confines of the highly constricted gaps g between the cam formations and cap bottom on twisting the cap from its release position (FIGS. 4, 5A and 9) into an exemplary lock position (FIGS. 6 and 10) with a fairly reasonable force which may conveniently be applied to the cap by way of ordinary pliers. The exemplary bead-type cam formations 54 are further characteristic in that their operative engagement with the body flange 30 is confined not only to a few spaced locations thereon, but also to areas thereof which are of no more than spot dimensions. With the compressive force applied by the cam formations 54 to the flange 30 and base 40 of the body and gland parts being thus divided and concentrated on a few area spots of these parts, the affected metal of these parts is tortured far more than if this compressive force were undivided and applied evenly to the total confronting areas of these parts, and this compressive force, produced by forced wedge action of an infinitely small wedge angle on spot locations on these parts, is of particularly high magnitude which tortures the affected metal of the parts into distortion that has a positive and strong interlock effect on the parts.

While the cap 24 is in its release position in which its cam formations 54 are in axial alignment with the notches 32 in the body flange 30 (FIGS. 4, 5A and 9), the cap has freedom of axial movement with its cam formations into and from register with the notches 32, as a result of which the locking gland 26 is with its ring base 40 separated from or seated only loosely on the body flange 30 so that the prongs 42 of the gland will readily yield to the conduit c on its insertion into the connector. However, on twisting the cap 24 from its release position and thereby locking the body flange 30 and gland 26 to the connector cap 24 as explained, the locking gland will be put under stress, with ensuing distortion of the prongs 42 thereof into an exceedingly tight jam fit with the conduit c which will certainly lock the latter to the gland 26, and thereby also to the body 22, against retraction from the connector. The jam fit of the prongs 42 of the locking gland 26 with the conduit is also more than adequate to resist any accidental turning of the conduit in the locking gland and, hence, also in the connector due to the explained exceedingly strong lock of the gland to the connector body.

Provisions are also made on the connector whereby the inserted conduit c becomes locked to the connector on twisting the cap 24 from its release position (FIGS. 4, 5A and 9) in one certain direction into a predetermined lock position (FIGS. 5, 6 to 8 and 10). To this end, the peripheral wall 28 of the connector body 22 is provided with a preferred single interference formation 62 which is to cooperate with an interference formation on the rim 38 of the cap 24 in the form of one of the described impressed ribs 60 on the cap which is identified by the reference numeral 60a. The interference formation 62 on the cap 24 is in the preferred form of a round bead which is conveniently impressed in the cap rim 38. Thus, in the release position of the cap 24, the interference rib 60a on the cap 24 is in the angular position in FIGS. 3 and 5 in which the same is spaced a short distance from the interference bead 62 on the connector body 22 in a counterclockwise direction. In order to lock the conduit c to the connector, the cap 24 must be twisted from its release position in FIGS. 3 and 5A, clockwise in this instance, until the interference rib 60a on the cap encounters and snaps over the interference bead 62 on the connector body, with the cap then being in its predetermined lock position (FIGS. 6 to 8 and 10) which is unmistakably indicated to the person twisting the cap by a clearly felt snap-action of the interference rib 60a over the interference bead 62. Accordingly, the only instruction to anyone for securely locking a conduit to a connector is to twist the connector cap clockwise until the explained snap-action is felt.

The connector body 22 is further provided on its peripheral wall 28 with a stop formation 64 which is in the preferred form of an impressed bead of greater height than the interference bead 62. The stop bead 64 is preferably on the same level as the interference bead 62 (FIGS. 1 and 6 to 8), with the stop bead 64 being so spaced from the interference bead 62 that on a twist of the cap 24 from its release position (FIG. 3 and 5A) in the wrong direction, i.e., counterclockwise in this instance, the interference rib 60a on the cap will come into engagement with the stop bead 64 and be thereby stopped before the cam formations 54 can exert any clamping force on the body flange 30 and gland base 40 thereon. Accordingly, a twist of the cap 24 from its release position in correct, clockwise, direction is imperative in order to lock the conduit c to the connector.

The cap 24 and the locking gland 26 are also locked to the connector body 22 against removal therefrom. To this end, the rim 38 of the cap is provided on its inside with at least one, and preferably several, stop formations 66 in the preferred form of impressed beads. There are in this instance three of these stop beads 66, i.e., as many as there are interrupted parts of the body flange 30, with these stop beads 66 being angularly spaced from the cam formations 54 in the cap so that the stop beads 66 are in axial alignment with the three interrupted parts of the body flange 30 in the only angular position of the cap, i.e., its release position (FIGS. 4, 5A and 9), in which the same and also the locking gland 26 could be removed from the connector body were it not for the fact that the interrupted parts of the body flange 30 are then in stop relation with the stop beads 66 (FIGS. 5, 5A and 9).

FIG. 11 shows a modified connector 20' which may in all respects be like the described connector 20 of FIG. 1, except that the modified connector is adapted for connecting two conduits, and to that end has duplicate caps 24', outward flanges (not shown) at each end of the connector body 22', and a locking gland (not shown) for each cap 24'. The connector body 22' is in this instance provided in its wall 28' with a peripheral groove 70 which is preferably impressed in the body wall 28' so as to provide internal stop shoulders for conduits to be connected.

What is claimed is:

1. A conduit connector, providing a tubular body with an axis and an outwardly extending endflange with angularly spaced notches; a locking gland having a flat ring base with inward prongs thereon and being with its base normally resting on said body flange; and a cup-like cap having a bottom with a central aperture and peripheral rim with angularly spaced inner cam formations thereon, said cap being projected with its rim over said gland and body flange with its bottom aligned with said gland base, and being turnable into and from a release position in which said cam formations are aligned with said notches and said cap has freedom of axial movement into raised and lowered positions in which said cam formations are in and out of register with said notches, respectively, and said cam formations being so spaced from said cap bottom that on turning said cap in said lowered position thereof from said release position said cam formations engage said body flange and clamp the same and said gland base thereon to said cap bottom.

2. A conduit connector as in claim 1, in which said cam formations have high points nearest said cap bottom shaped as wedges of infinitely small wedge angle.

3. A conduit connector as in claim 1, in which said cam formations are designed to cooperate with said body flange in progressively moving said cap from said raised position into said lowered position and then clamping said body flange and gland base thereon to said cap bottom on turning said cap from said release position.

4. A conduit connector as in claim 1, in which said cam formations are round beads impressed in said cap rim.

5. A conduit connector as in claim 1, in which said cap rim is further provided with at least one inward projection angularly displaced from said cam formations and so spaced from said cap bottom as to engage said body flange in said raised cap position and thereby lock said cap and gland against removal from said body.

6. A conduit connector as in claim 5, in which said inward projection on said cap rim is in the form of an impressed bead.

7. A conduit connector as in claim 5, in which said cam formations are round beads impressed in said cap rim, and said inward projection on said cap rim is another impressed bead.

8. A conduit connector as in claim 1, in which said cap has an angular lock position in which said cam formations clamp said body flange and gland base thereon to said cap bottom, and said body wall and cap rim have first and second interference formations, respectively, of which said first formation is in the path of said second formation, and the latter is snapped over said first formation, on twisting said cap from said release position, with said cap being in said lock position on the snap of said second formation over said first formation.

9. A conduit connector providing a tubular body having a peripheral wall and an outwardly extending endflange with a certain number of equiangularly spaced notches therein dividing said flange into spaced sections; a locking gland having a flat ring base with inward prongs thereon and being with its base normally resting on said flange sections; a cup-like cap having an axis and providing a bottom with a central aperture and a peripheral rim about said axis; equiangularly spaced cam formations on the inside of said cap rim and of a number equal to said certain number, said cap being projected with its rim over said gland and flange sections with its bottom aligned with said gland base, and being turnable into a predetermined lock position in which said cam formations are in axial alignment with said flange sections, and into a release position in which aid cam formations are in axial alignment with said notches between said flange sections and said cap has freedom of axial movement with said cam formations into and from register with said notches, with said cam formations having high points closest to said cap bottom and axially spaced therefrom by a gap into which said flange sections and gland base thereon extend in said lock position of said cap, and which is of a width so that said flange sections and gland base thereon are clamped to each other and to said cam formations and cap bottom; outer and inner interference beads on said body wall and cap rim, respectively, of which said outer bead is in said release position of said cap spaced from said inner bead in said certain direction at an angle which is less than that between successive notches in said body flange so that on a twist of said cap from its release position in said certain direction said inner bead encounters and snaps over said outer bead and thereby indicates said predetermined lock position of said cap; and an outer stop bead on said body wall spaced from said outer interference bead thereon in a direction opposite to said certain direction by an angle so much smaller than that between successive notches in said body flange that said stop bead is in the path of said inner interference bead in said cap and stops the latter in a position in which said high points of said cam formations are out of axial alignment with said flange sections on twisting said cap from its release position in said opposite direction.

10. A conduit connector as in claim 9, in which said cam formations are first round beads impressed in said cap rim, said outer interference and stop beads are round and impressed in said body wall, and said inner interference bead is a rib of axial extent impressed in said cap rim.

11. A conduit connector as in claim 10, in which said first beads are formed by the round ends of inner axially extending rib formations of particular section impressed in said cap rim, said inner interference bead is formed by one of said impressed rib formations on said cap rim, and said cap rim is provided with at least one further impressed inward bead angularly displaced from said first beads so that one of said flange sections is, on axial movement of said cap in said release position away from said body, in the path of and engaged by said further bead to thereby lock said cap against removal from said body.

* * * * *